United States Patent [19]

Cook et al.

[11] Patent Number: 4,889,439
[45] Date of Patent: Dec. 26, 1989

[54] AUTOMATIC PAGE END FEATURE FOR AN ELECTRONIC TYPEWRITER

[75] Inventors: Sherry A. Cook, Lexington; Patrick J. Gerstle, Nicholasville; David R. Smith; Kathryn R. Stilz, both of Lexington, all of Ky.

[73] Assignee: International Business Machines Corporation, Armonk, N.Y.

[21] Appl. No.: 149,805

[22] Filed: Jan. 29, 1988

[51] Int. Cl.$^4$ .............................................. B41J 29/22
[52] U.S. Cl. ....................................... 400/706; 400/76; 400/904
[58] Field of Search ...................... 400/706, 707.1, 708, 400/76, 904

[56] References Cited

U.S. PATENT DOCUMENTS

4,497,589  2/1985  Figini .................................... 400/706

FOREIGN PATENT DOCUMENTS

1289  1/1984  Japan .................................... 400/706
244571  10/1986  Japan .................................... 400/706

OTHER PUBLICATIONS

IBM Tech. Disc. Bulletin, "Adjusting a Cross Page End Control for Pagination", Nielsen, vol. 24, No. 11B, Apr. 1982, pp. 5860–5861.

IBM Tech. Disc. Bulletin, "Page, End Control", Bluethman et al. vol. 17, No. 4 Sep. 1974, p. 962.

IBM Tech. Disc. Bulletin, "Bottom Margin Detection for Last Line Printing", Raesy et al, vol. 27, No. 3, Aug. 1984, p. 1739.

Primary Examiner—William Pieprz
Assistant Examiner—James R. McDaniel
Attorney, Agent, or Firm—Laurence R. Letson

[57] ABSTRACT

The invention automatically divides the text at the end of the page in such a way that widow lines and orphan lines of text do not exist. The typewriter shifts the effective page end point to shift the orphan line of text to the next page of text or delays the page ending to accommodate the widow line on the present page rather than forcing the line to the top of the next page. The text is not altered in the memory of the typewriter and no stop codes or page end codes are inserted in the text memory, thereby eliminating revision problems with the paginated text.

4 Claims, 6 Drawing Sheets

AUTOMATIC PAGE END FEATURE FOR AN ELECTRONIC TYPEWRITER

FIELD OF THE INVENTION

This invention relates to the automatic functions of an electronic typewriter and more specifically to the automatic control of the number of lines of text that are printed onto a page of paper, or the page ending operation, when the typewriter is operated in the playout mode. The function eliminates page separation of single lines of text, resulting in what is generally termed "widow" and "orphan" conditions which detract from the aesthetics of the final printed copy.

BACKGROUND OF THE INVENTION

Electronic typewriters have memory storage for the storing of text. As this text has been played out in the past, the operator normally was required to insert the necessary stop codes in the text string in order to terminate playout of the text at the desired point where the text would need to be divided for pagination.

If the text is edited in any way that changes the position of the words in the text and the number of lines of text in the document, the stop code previously inserted in the text will cause the termination of printing either too early or too late to properly end the text at the desired place on the page.

For the document to have a pleasing and proper appearance, the operator must, after the editing, repaginate by removing stop codes and reinserting the new stop codes into the text string at the required points.

Some electronic typewriters have the ability to count the number of lines of text printed onto the page and to terminate the text when the page is filled to the preselected limit.

However, when the page termination is solely controlled by line count, the page may have a single line of text from a paragraph beginning left standing alone at the bottom of a page, or all of a paragraph being printed at the bottom of a page except the last line of the paragraph which will then appear by itself at the beginning of the next page. These two conditions are referred to as "orphans" and "widows" and detract from the aesthetics of the finished document.

SUMMARY OF THE INVENTION

The invention disclosed herein automatically compares the position of the line of text being played from the memory, to the end of page position and the position and nature of the following line of text. As each character is played, the line of text in which it resides is checked to determine its relative position on the page with respect to the predetermined line count for the page and whether it is a first or last line in a paragraph. If the line of text would occupy the last line on the page, and is the first line of the paragraph, the playout is terminated at the end of the previous line of text and the text of the line of text is shifted to the next page of the document. If, on the other hand, the line is the next to the last line of text in the paragraph and the last line of the page, then the lower boundary of the page is ignored and the next line of text, the last line in the paragraph, printed, thereby avoiding a widow line on the next page. Thus, a page may be terminated at, one line above or one line below the designated end of page location.

The processing of the text during playout includes the continual checking of the relative locations, and does not require page ending stop codes. If editing occurs, which shifts the text, the processing of the text codes, as the text is played out, will adjust the ending of the page.

A more detailed description of the invention and its best mode of implementation is made below with reference to the drawings.

DRAWINGS

DETAILED DESCRIPTION OF THE INVENTION

Figure 1:
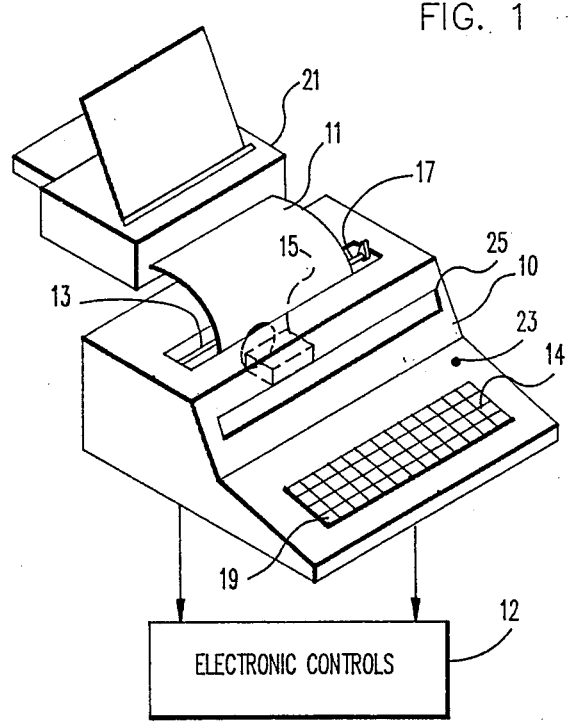
FIG. 1 is a block diagram of the electronic typewriter.

Referring to FIG. 1, the electronic typewriter 10 is illustrated with the electronic controls 12 shown symbolically as a block exterior to the typewriter 10. The electronic controls 12 receive electronic signals from the keyboard 14 and send electronic control signals to the typewriter 10 to cause the typewriter to perform the functions that have been designated at the keyboard 14, such as print a character, carriage return, tabulate, correct a character or line feed. Platen 13 supports record sheet 11 for movement in the line feed direction, in conjunction with paper bail 17. Paper bail 17 also controls paper insertion as in U.S. Pat. No. 4,266,880. Code key 19 alters the electronic codes generated by the keyboard 14 and paperbail 17 to give such signals alternate meanings.

Figure 2:
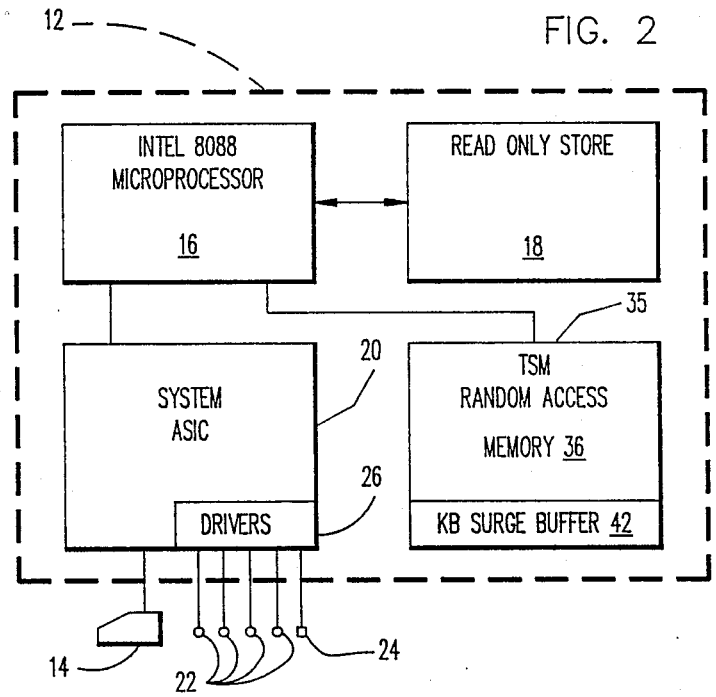
FIG. 2 is a block diagram of the electronic controls of the typewriter.

For a better understanding of the electronic controls 12, refer to FIG. 2. Electronic controls 12 are displayed as four blocks, a microprocessor 16, a Read Only Store 18, a bank of status registers 44 shown in FIG. 3 and a system ASIC or Application Specific Integrated Circuit 20, and memory 35.

The microprocessor 16 may be any of a number of commercially available microprocessors. The preferred microprocessor, chosen for this description, is the Intel 8088, sold by the Intel Corporation, Santa Clara, California. One skilled in the art will recognize that this is a general purpose microprocessor for which other processors may be substituted. The microprocessor 16 is controlled by supplying to it software instructions in the form specified by the manufacturer. These instructions constitute a control program which is stored in a suitable memory such as the Read Only Store 18. The Read Only Store memory 18 is loaded with the instructions at the time of manufacture and contains the set of instructions necessary for the microprocessor 16 to make the typewriter 10 function as desired.

The system ASIC 20 is a standard set of AND, OR and other logic elements which may be customized as the user desires, specifically in this device to scan the keyboard 14 and control the signals from the keyboard 14. The ASIC 20 also controls the interrupts to the processor 16 and captures the keyboard signals until they are used by the processor 16. Also the ASIC 20 controls the signals from the processor 16 and directs the processor output signals to a set of driver circuits 26 which convert the processor signals into signals that can be used to drive motors 22 and magnet 24.

The specific combination of the discrete logic elements in the ASIC 20 is designed to provide a number of functions and signals. Some of the signals and functions provided are the keyboard scan to detect any newly depressed keys, interrupts of the processor 16 to cause the processor to accept a signal and the timing of signals sent to the drivers 26 so that the motors 22 and magnet 24 of the typewriter operate in the proper time frame and sequence.

The keyboard scan function, timer operation, interrupt operation and other functions of the ASIC 20 are all found essentially in commercially available keyboards with discrete components and perform the same operation. The ASIC 20 only serves to consolidate all such operations on a single chip and thus economize in space as well as cost.

Figure 3:
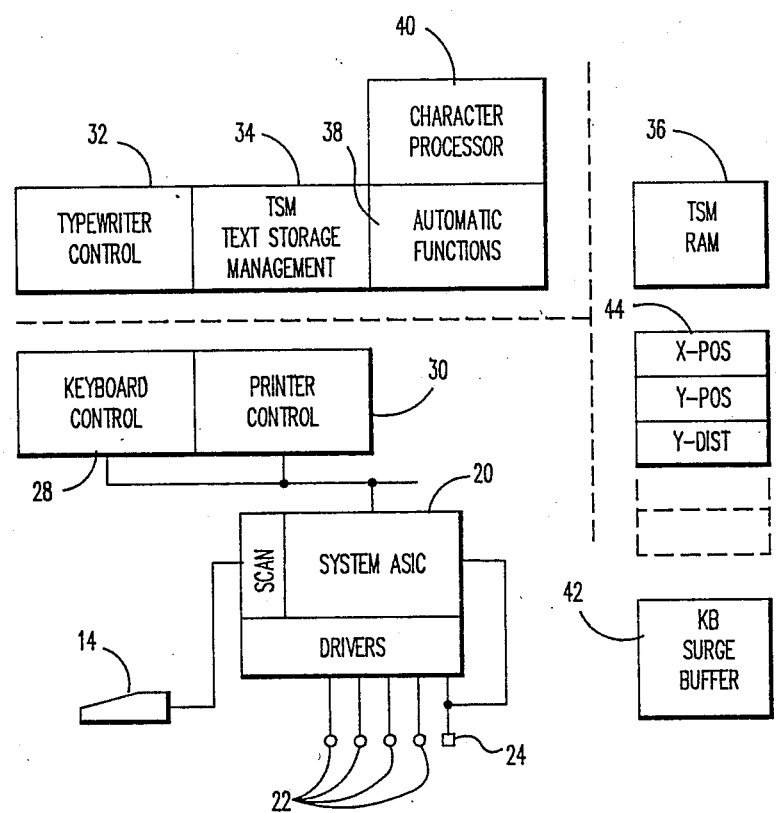
FIG. 3 is a block diagram of the functional relation of the microprocessor with the software and the keyboard, motors, magnet, and memories of the typewriter.

To further expand the description of this feature, FIG. 3 illustrates an expanded functional representation of the microprocessor 16 and its associated software. The software may be prepared by any programmer of ordinary skill in the art and may take any number of forms, any of which will adequately perform the functions of controlling the typewriter 10.

The ASIC 20 is connected to the processor 16 and is responsive to the keyboard control 28. The ASIC 20 scans the keyboard 14 and interrupts the microprocessor 16 when the ASIC 20 detects a key state change. The keyboard control 28 causes the storage of the keystrokes from the keyboard in the keyboard surge buffer 42 until the typewriter control 32 is ready to work on the keyboard scan data.

The printer control segment 30 generates and sends the signals that are needed to operate the printer, to the ASIC 20 so that the signals may be properly sequenced and timer controlled.

The typewriter control 32 serves to accept the keyboard data from the keyboard control 28 whenever the processor 16 is available to process textual data and acts to determine whether the keyboard data is representative of the alphanumeric symbols that are to be printed or representative of the functions that may be keyboard controlled. The typewriter control 32 utilizes the capabilities of the Keyboard Control segment 28 to retrieve the stored scan codes from the keyboard surge buffer 42.

To manipulate the text in Random Access Memory 36 and retrieve the text, the Text Storage Management segment 34 (TSM) controls the storage of text and the necessary other codes that facilitate the efficient operation of the Random Access Memory 36. The Text Storage Memory of Random Access Memory 36 is the repository of the stored codes containing the text. When Character Processor 40 indicates a need for a new line header for text, the TSM 34 utilizes the contents of the status registers 44, which contain the location of the print mechanism, relative to the record sheet 11, to build the line header and store it in the memory 36. A line header contains data defining the X and Y positions of the first character on the line, as well as other information not necessary for this invention.

In order to perform functions automatically in response to keyboard commands, the Automatic Functions segment 38 is responsible for the controlling of those functions which are performed by the typewriter 10, and which are not character processing operations.

The output signals of the Automatic Functions segment 38 pass to the printer control segment 30 where the signals are processed to generate the precise control signals necessary to control the motors 22 of the typewriter 10.

To identify, select and print characters and escape the print mechanism 15, along a line to be printed, the Character Processor segment 40 has the dedicated purpose of receiving those codes from the typewriter control segment 32 that represent the characters or other symbols that are to be printed on the record sheet 11. The Character Processor segment 40 receives a decoded scan output of the keyboard 14 and determines if it is printable in the desired location. The Character Processor segment 40 is also responsible for storing the character codes in a correction buffer which is part of the TSM Random Access Memory 36.

The Character Processor 40 passes the printable character code to the Printer Control segment 30 which then, based on the data received, determines the specific motors 22, numbers of pulses, direction, and current levels to the motors 22 and magnet 24 that are required to properly print the symbol on the record sheet 11, as is conventional.

A keyboard surge buffer 42 is a storage device provided so that in the event that keyboard scan data is received by the system ASIC 20 at a higher rate than the system can or does utilize the information, the key stroke scan data will not be lost to the keyboard control 28.

The illustration of the different segments of the operations are schematically illustrated as dedicated functional blocks of the processor 16 with the software instructions stored in the Read Only Storage 18 interacting with the processor 16 to perform the necessary data processing and produce the output signals required to control the typewriter 10 to either perform a function or to print a symbol at the desired location on the record sheet 11. Thus, FIG. 3 is a functional diagram expressed in both hardware and a combination of hardware and software.

Figure 4A:
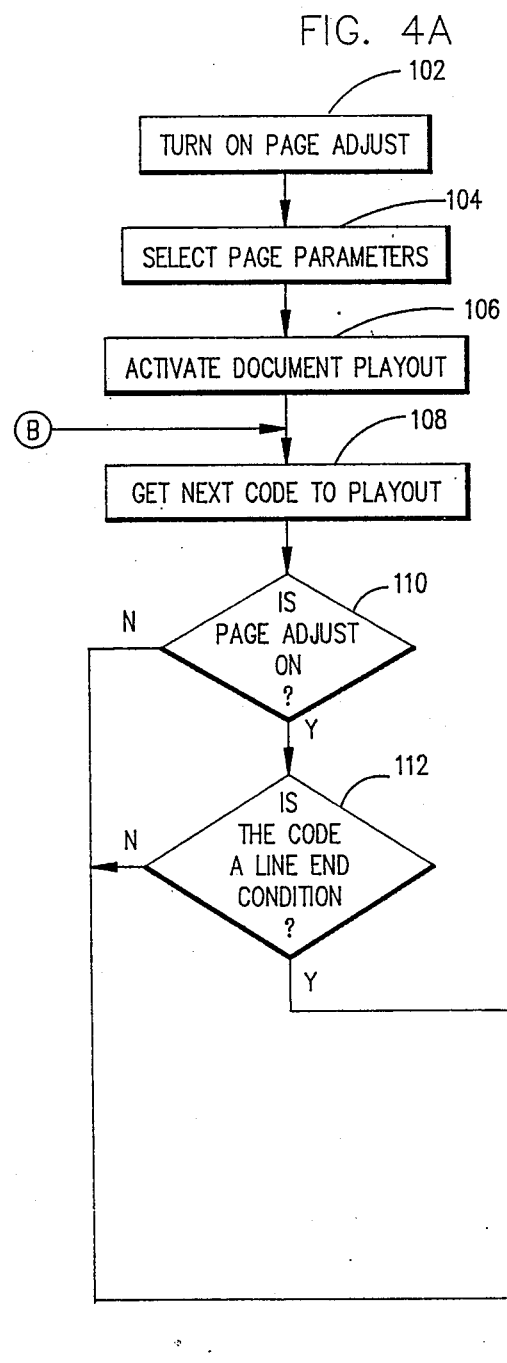
FIGS. 4A, 4B, 4C and 5 are flow diagrams of the operations performed by the electronic controls of the typewriter along with the operator input commands.

Turning now to FIG. 4A, the function is activated by the operator turning on the function through keyboard input, as illustrated in operation 102. The operator may then select the page parameters such as size and bottom margin size in operation 104, thereby controlling the number of lines on the page. The selection of page parameters will be discussed below in more detail with relation to FIG. 5.

The operator may then start the document playout operation as in operation 106, to cause the text codes previously stored in the Text Storage Memory 36 to be retrieved and processed to produce the typed copy.

As a result of the playout activation in operation 106, the text is retrieved from the text storage memory 36 and processed one character at a time as in operation 108.

As each character is retrieved from the memory 36, the decision is made as to whether the page adjust function is operational. This determination, made in operation 110, serves to allow the bypassing of the function logic if the function is not operational at that time. If the page adjust function is not activated and thus is not on, the logic flow is branched and flows to the processing of the retrieved character in operation 132, in FIG. 4C.

Should the page adjust function be on or activated, in operation 110, the logic flow is directed through the affirmative branch to operation 112, where the code is tested to determine if the code represents a line end condition. If the code does not represent a line end condition, then the determinations made with respect to the last line end code, in the previous line of text, as they relate to the position on the page and the page adjust function have not changed and there is no need to flow through the page adjust logic. Accordingly, the logic flow branches through the negative path to operation 132, where the retrieved character is processed for printing. The flow path passes through FIG. 4B to FIG. 4C.

Figure 4B:
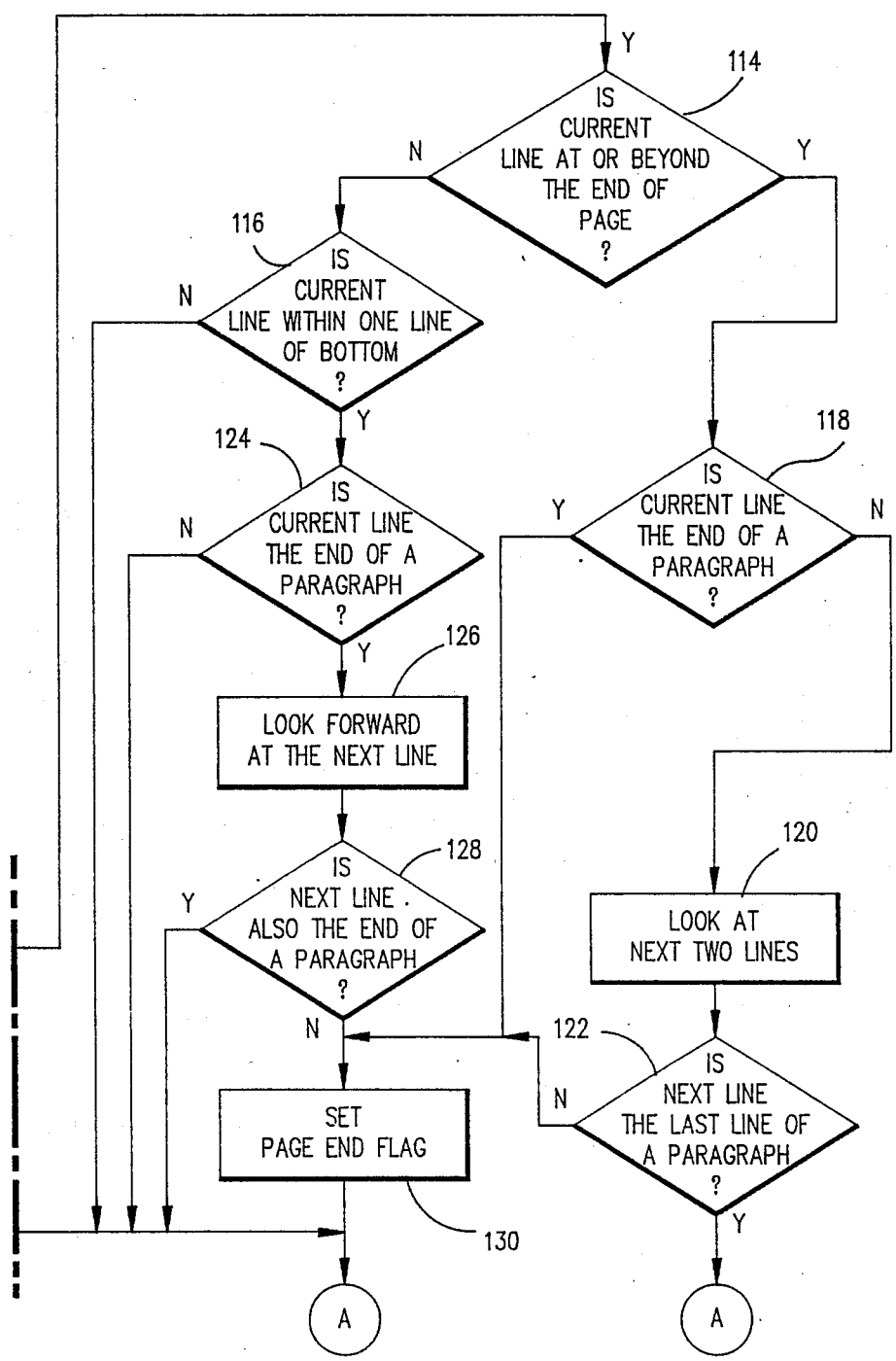

If the determination in operation 112 is that the code just retrieved in operation 108 is representative of a line end condition, then the flow path is along the affirmative path from operation 112 to operation 114 in FIG. 4B, where a determination is made as to whether the Y distance of the current line, containing the last retrieved code, is at or beyond the bottom limit of the page of text. This is accomplished by subtracting the Y distance of current line from the Y distance of the designated end of page text position, and if the remainder is less than or equal to zero, the affirmative path is followed to operation 118. The Y distance is the distance between the first line of text and the point being considered, expressed in stepper motor steps.

However, if the remainder of the above mathematical determination is greater than zero, then the flow branches to operation 116, following the negative path.

Referring now to operation 118, a determination is made as to whether the current line of text is the last line of a paragraph. This is determined by checking to ascertain if the current line of text is followed by, for example, a keyed carrier return, a tabulation command or a space prior to any other text. If the current line is at the end of a paragraph and the line is at or beyond the end of the page, then this is the natural point at which the end of the page should occur and the page end flag is set in operation 130.

The setting of the page end flag defines the end point of the text to be printed on that page. The page end flag will be used by the typewriter control to indicate that the page should be ejected if a paper feed mechanism 21 is attached to the typewriter 10 and a new sheet inserted or, alternatively, a page end indication activated such as a light 23, tone or message displayed on a display 25, with termination of typing after the last line.

Should, on the other hand, the current line of text not be at the end of a paragraph, then there must be at least one more line of text following the current line, and it is necessary to find out if the next line is the last line of the paragraph. If it is, then it should be printed also, even at the expense of extending the text beyond the end of page position, to prevent a widow line of text on the next page. Accordingly, with a negative determination in operation 118, the control flow branches at operation 118 to operation 120 where the next two lines of text are retrieved so that the data relating to their position on the page is available. Two lines are examined because codes in the second line, such as a tabulation code, can be necessary to identify the previous line as the last line in a paragraph.

With the next two lines of text now available, the determination as to whether the next line is the last line of a paragraph may be made, in operation 122.

If the next line is not the last line of the paragraph, then there is no need to manipulate the next line onto the present page, and the processing of the retrieved code may proceed, with the logic flow branching from operation 122 to operation 130, where the end of page flag is set prior to the flow to operation 132 where the retrieved code is processed.

Referring back to operation 116, the logic flow branches to this operation when the current line of text was not at or below the end of the page. Knowing that the line is not at or below the end of the page, the next step is to determine if the current line is within one line of the end of the page. This is accomplished by the subtraction of the Y distance of the line position of the current line of text from the Y distance of the last line position of the page. If the difference is for example, less than 32 for text being printed out in 10, 12 or proportional space pitch and less than 24 for text in 15 pitch, the determination is answered in the affirmative, the logic branches to operation 124. The exemplary counts are based on single line spacing and need to be adjusted in the appropriate multiples for double or triple line spacing.

If, however, the current line is not within one line of the end of the page, then further consideration of the relative position on the page is not necessary and the control flow branches to operation 132 for the processing of the retrieved code.

If, however, the current line is within one line of the bottom of the page, then the next determination to be made is whether that current line is at the end of the paragraph. Should the current line not be at the end of a paragraph as determined in operation 124, then there is no need to further analyze the position of the current line and the retrieved code may be immediately processed, and the control flow branches to operation 132, to accomplish that processing.

If the current line of text is found to be the end of a paragraph, for example, by looking to see if the line ends in a keyed carrier return or if the next line starts with a tab command or space prior to text codes, in operation 124, a further step is required. It is necessary to look forward in the memory to the next line, in operation 126 to make that text data available at operation 128, to determine if the next line is also the end of a paragraph. This condition could exist if the next line is a one line paragraph. When the one line paragraph condition is found in operation 128, then the current line will not be the end of the page, since the one line paragraph will be printed on the same page and thus, the control will branch to operation 132 where the retrieved code is processed.

If the decision in operation 128 results in a finding that the next line of text is not also an end of a paragraph, then the text should be divided after the current line and the next line of text will be the start of the following page. To divide the text at this point, the page end flag is set denoting the termination of the text for that page, in operation 130.

Since all conditions have been considered and tested, and the text has been divided, the remaining task is to process the retrieved code, which is a line end code, so the control flow is directed from operation 130 to operation 132.

Figure 4C:
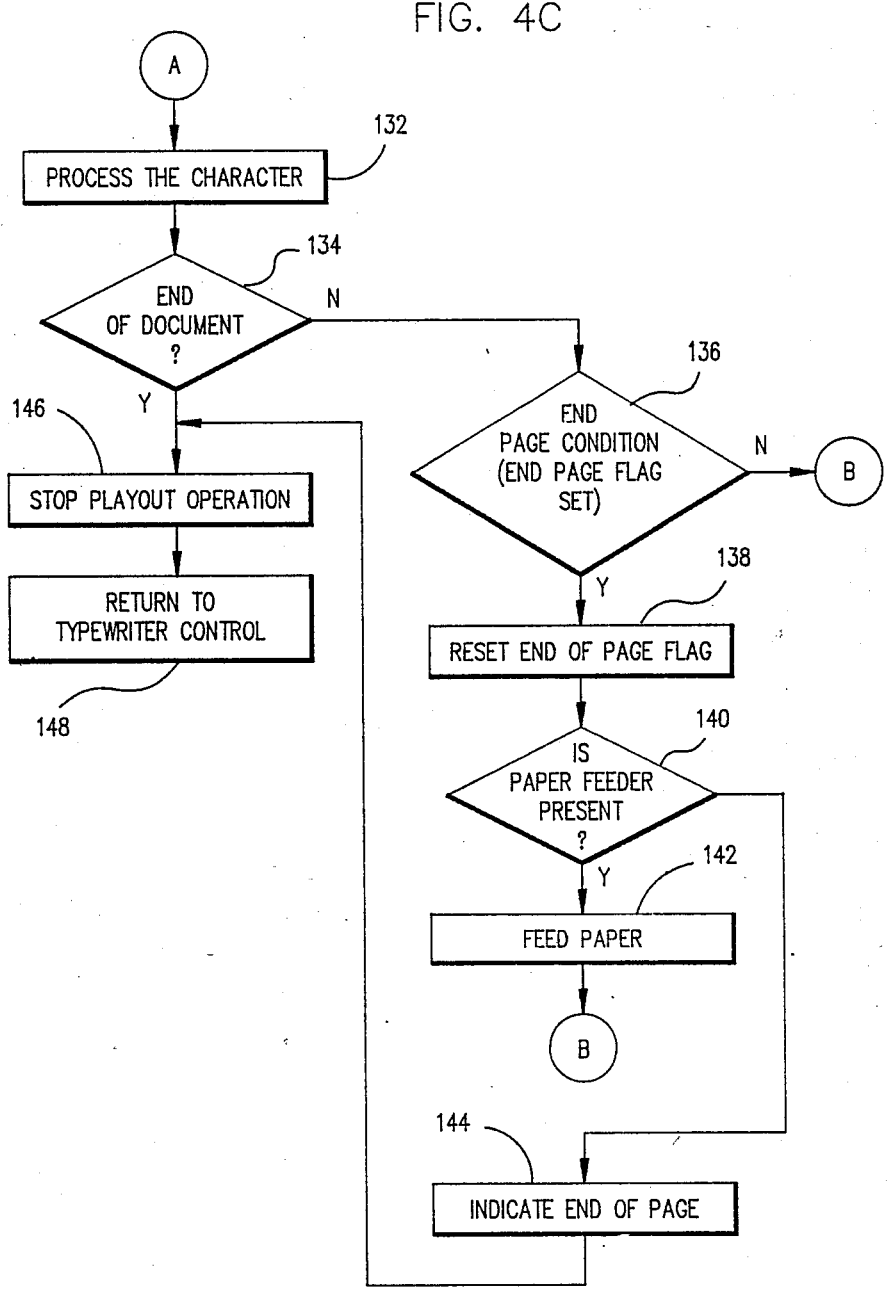

Referring to FIG. 4C, the flow is from operation 132, to operation 134, where a determination is made as to whether the processed code was a code designating the end of the document. If the code represents the end of the document, then the flow is through the affirmative branch to operation 146, where the playout of the text is terminated.

Once the playout of the text is terminated, in operation 146, the control of the microprocessor is returned to typewriter control 32, in operation 148.

Should the determination made in operation 134 be that the code processed is not an end of document code, then the flow branches to the operation 136 where it is determined whether the end page condition is turned on, or stated differently, whether the end page flag is set. If the end page flag is not set, then the control flow branches back to operation 108 in FIG. 4A, where the next code is retrieved for playout.

If the end page flag is set, then the determination in operation 136 will divert the control flow to operation 138 where the end of page flag is reset. This conditions the end page status register 44 so that its contents reflecting the end page status are in a reset state and can then be set on a subsequent operation.

Since the typewriter may have a paper feed device 21 attached to it, there must be a check to determine if such a device 21 is present, in operation 140 and if no such device is present, then the typewriter 10 will then indicate the end of the page, as in operation 144. This indication may take any number of forms. In modern electronic typewriters, the indication can take the form of a blinking indicator light 23, a beeping tone, the locking up of the keyboard, the spinning of the print wheel if one is present or a message displayed on a display 25. All of these audible or visual feedbacks are present on typewriters in the market place and available presently, as an alerting device to get the attention of the operator for varying reasons.

Should the presence of a paper feed mechanism 21 be detected, then the affirmative branch directs the flow to the operation 142 at which the command is issued to feed the paper out of the typewriter 10 and to feed the next page into the typewriter 10. While the paper feed mechanism 21 is not part of the invention, its inclusion in the control flow is to provide a more complete description of the capability of the feature, both in the print out of text with automatic paper feeding and with manual paper insertion and feed.

After the issuance of the paper feed command in operation 142, the control branches to the point where the next operation 108 causes the retrieval of the next code that is to be played out of memory.

Figure 5:
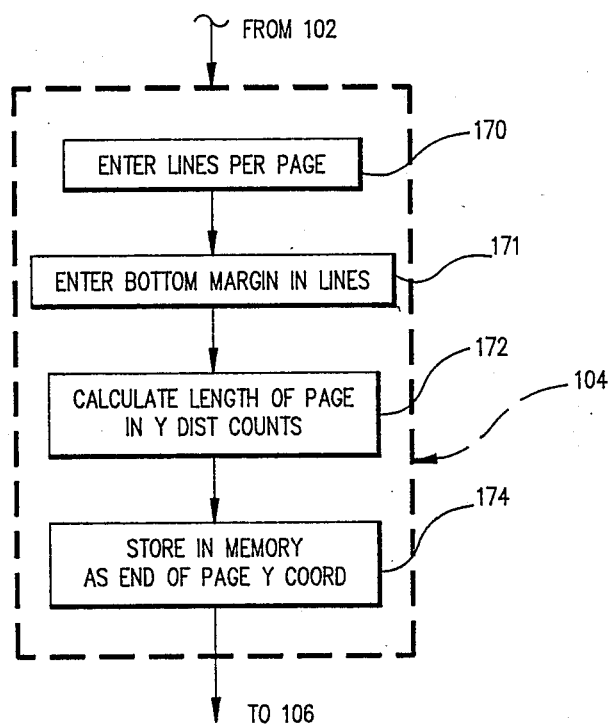

Referring now to FIG. 5, the operation of the control logic for operation 104 is expanded. When the control logic of the typewriter 10 flows to operation 104, the operator has the opportunity to define the page size in terms of the number of typing lines that may be placed on each sheet of paper. For purposes of this discussion, the number of lines on the page is determined by the pitch of the characters being printed, and the length of the text on the page. For example, for characters being typed in 10, 12 or proportional space pitch, the paper feed is designated as 1/6 of an inch for each print line, and for characters in 15 pitch, the line feed increment is ⅛inch. The fact that a print line may or may not be actually occupied by printed characters does not enter into the calculations for setting page size.

Page size and bottom margin are enterable through the keyboard to define the Y Distance of the end of page position. The page length is entered through the keyboard in terms of the number of lines that can be accommodated on the desired page size, for example 66 lines per page for 11 inch paper and using 10 pitch print, at operation 170. Similarly, the bottom margin is defined by entry of the length of the bottom margin, at operation 171.

The top margin is either default set by the typewriter 10 at one inch or 6 lines for ten pitch print, or is set at some other location by operator command, for example, by the depression of the code key 19 and the activation of a paper bail 21. This acts to load into the status register 44 designated to store the top margin position, a data code representing the top line position.

With the top margin set and the bottom margin defined, the top and bottom margin distances are subtracted from the page length and the remainder is then multiplied by the number of stepper motor steps per print line to yield the Y distance of the end of page position, relative to the first print line position, as in operation 172.

This result is the Y distance of the last typing line on the page. The number of the steps per inch of paper feed depends, of course, on the design of the typewriter and the selection of the stepper motor and the gearing ratio of the platen drive, but for example, one inch of paper feed may require 192 stepper motor pulses, with the count for an eight lines per inch feed being 24 stepper motor steps per print line and 32 stepper motor steps for a 6 lines per inch paper feed.

After the end of page Y distance is determined in operation 172, the value is then stored at operation 174 in one of the status registers 44 so that it is available any time the function is invoked. The value will remain available until the power is removed from the typewriter if the typewriter is designed with a memory preservation capability, even though the typewriter may be turned off. Thus the last entered page size definition is the continuing condition, until it is changed as just described.

After the end of page Y coordinate value is stored, in operation 174, the flow of the control returns to the flow path from operation 104 to the operation 106, in FIG. 4A.

The description of the above embodiment is not intended to be limited to the use of the Intel 8088 processor but this is only illustrative one possible implementation and regardless of the choice of the processor, one skilled in the art, based on the teachings of this disclosure, could program the selected processor to control the typewriter 10 in the desired manner.

We claim:

1. An electronic typewriter having an automatic page end control, comprising:
   a memory for storing codes representing graphic symbols and functions, and operating parameters for controlling said typewriter;
   a print means for printing said symbols on a page;
   a keyboard for entering keystroke input commands representing control commands for controlling functions and graphic symbol codes;
   page support and feed means for supporting and feeding a page of paper;
   electronic control means for receiving said control commands and symbol codes from said keyboard, storing said commands and codes in said memory, controlling said print means in accord with said control commands add for retrieving said symbol codes from said memory and using said symbol codes to control said print means to cause printing of said symbols on said page;
   said automatic page end control comprising:

operator controllable means to select and store in said memory a page end position for text termination on a page;

means for determining the position of the print line upon which said text is to be printed;

means for determining the relative position of said print line to said page end position as said text is printed;

means for determining the proximity of said print line to the end of a paragraph containing said print line as said text is being printed; and text terminating means for terminating said text at a position other than said page end position in response to a determination by said means for determining the relative position that said print line occupies one of a plurality of predetermined relative positions to said page end positions and a determination by said means for determining the proximity that said line of text occupies a position within a predetermined distance of the end of a paragraph, whereby said electronic typewriter will print text while controlling the text termination to prevent printing of a first line or a next to the last line of a paragraph of text as the last line of text on said page.

2. The typewriter of claim 1 wherein said text terminating means comprises means for setting an indicator in said electronic control means to indicate that said text has been terminated for said page.

3. The typewriter of claim 1 wherein said text terminating means comprises means for setting an indicator terminating said text at least one line prior to said page end position to prevent the leaving of a single line of a paragraph isolated at the end of the printed page.

4. The typewriter of claim 1 wherein said text terminating means comprises means for setting an indicator terminating said text at least one line below said page end position to prevent the printing of a single line of a paragraph isolated at the beginning of the following printed page.

* * * * *